(12) United States Patent
Bress et al.

(10) Patent No.: US 7,159,086 B2
(45) Date of Patent: Jan. 2, 2007

(54) SYSTEMS AND METHODS FOR CREATING EXACT COPIES OF COMPUTER LONG-TERM STORAGE DEVICES

(76) Inventors: Steven Bress, 17917 Wheatridge Dr., Germantown, MD (US) 20874; Mark Joseph Menz, 114 Rawlings Ct., Folsom, CA (US) 95630

( * ) Notice: Subject to any disclaimer, the term of this patent is extended or adjusted under 35 U.S.C. 154(b) by 323 days.

(21) Appl. No.: 10/765,343

(22) Filed: Jan. 27, 2004

(65) Prior Publication Data

US 2004/0186969 A1  Sep. 23, 2004

Related U.S. Application Data

(60) Provisional application No. 60/443,387, filed on Jan. 29, 2003.

(51) Int. Cl.
*G06F 12/16* (2006.01)
*G06F 12/14* (2006.01)

(52) U.S. Cl. ........................ 711/162; 711/170
(58) Field of Classification Search ................ 711/162, 711/165
See application file for complete search history.

(56) References Cited

U.S. PATENT DOCUMENTS 3,516,431 A * 6/1970 Wagner et al. .............. 137/266
5,835,954 A * 11/1998 Duyanovich et al. ....... 711/162
5,953,513 A * 9/1999 Saiki et al. ................... 710/62
6,173,377 B1 * 1/2001 Yanai et al. ................. 711/162
6,339,814 B1 * 1/2002 Iida ............................. 711/161
6,438,638 B1 * 8/2002 Jones et al. .................. 710/301
2003/0023867 A1 * 1/2003 Thibadeau ................... 713/200

OTHER PUBLICATIONS

McLean, Pete. "Device Configuration Overlay Proposal". Oct. 24, 2000, Maxtor Corporation, pp. 1-16.*

* cited by examiner

*Primary Examiner*—Matthew Kim
*Assistant Examiner*—Lev Iwashko

(57) ABSTRACT

A Simple Device for creating exact copies of computer long-term memory devices such as hard drives and compact flash memory. Our current invention is a stand-alone device. A user connects a long-term memory device he desires to make a copy of (source) to our device. The user also connects a long-term memory device to receive this copy (destination). Our device contains logic and circuitry, which perform operations on both the source and destination device to make an exact copy of the Source Data to the Destination Device, while protecting the Source device from any changes. Our device has a very simple user interface. This simplified user interface makes it difficult and unlikely to use our device incorrectly.

21 Claims, 7 Drawing Sheets

Figure 2

Printout Example

```
----------------------

Source Drive

Model: WDC1103
      S/N: WD-1524305
 Firmware: 2.00.34C
     Size: 45.2 Gigs

Destination Drive

Model: WDC1406
      S/N: WD-3258741
 Firmware: 2.10.21
     Size: 59.6 Gigs

----------------------
       Copy Results

Bad Sector: 1,324,544
 Bad Sector: 6,564,974

---Copy Complete---
```

Drive Copy Logic under US 7,159,086 B2

SYSTEMS AND METHODS FOR CREATING EXACT COPIES OF COMPUTER LONG-TERM STORAGE DEVICES

RELATED APPLICATION

This application claims priority under 35 U.S.C. § 119 based on U.S. Provisional Application No. 60/443,387, filed Jan. 29, 2003, the disclosure of which is incorporated herein by reference.

BACKGROUND OF THE INVENTION

A. Field of the Invention

The present invention relates to computer memory devices and, more specifically, to mechanisms for making exact copies of these devices.

B. Description of Related Art

There are many situations in which it is desirable to make exact copies of long-term memory storage device, such as computer hard drives and flash memory. For example, law enforcement officials have occasion to confiscate long-term memory storage devices. Once confiscated, the law enforcement officials need to be able to examine the storage device without changing the storage state of the device. In addition, other court officials such as defense attorneys have a need to examine confiscated long-term memory storage devices. These examinations are typically performed on an exact copy of a long-term memory storage device, so there is no danger of changing the storage state of the original device.

An example of another situation in which it is desirable to make exact copies of long-term memory storage device is in the area of computer security. Corporate Security and Corporate IT personnel are frequently tasked with making exact copies of long-term memory storage devices. Typically this involves a wide variety of devices running under an assortment of operating systems.

There are a number of known conventional techniques for making exact copies of long-term memory storage devices. One class of early techniques revolved around the concept of simply using software on a PC. These techniques are neither safe, nor easy to implement. To make a software copy, an operator must know technical information about the drive to be copied. Secondly the computer that is to be used to make a copy must be configured correctly. Thirdly, the simple act of running a drive under an operating system, such as Microsoft Windows® may change the source drive.

A second class of techniques for making exact copies of long-term memory storage devices involves dedicated stand-alone devices. A company named Logicube produces such a device. This device has numerous operating modes and options that must be specified before making a copy. Options are selected through the use of a number of buttons and a small display. One of the options is to delete the contents of what will be the destination drive. This device requires a trained operator and it has enough options to cause confusion or errors on the part of its user.

Current stand-alone devices have several limitations. They do not copy hidden areas (HPA and DCO) automatically. They do not restore hidden areas automatically. They do not perform a read and compare verification after making a copy. They do not set the size of the copied drive to be the same as the original. They do not comply fully with TWGEDE/NIJ guidelines.

Accordingly, there is a need in the art for an improved mechanism for making exact copies of long-term memory storage devices.

SUMMARY OF THE INVENTION

Systems and methods consistent with the present invention address these and other needs by providing for an operating system independent copying device that is physically connected to a source storage device and one or more destination storage devices.

One aspect of the invention is directed to a copying device including a plurality of elements. Specifically, the copying device includes an interface emulator configured to emulate an interface presented by a storage device (source storage device) and one or more interfaces for connecting to storage devices (destination storage device). Additionally, the copying device includes control circuitry coupled to the interface emulator and the interface(s). A user controllable switch, when actuated by a user, causes the control circuit to perform the copying procedure. The control circuitry makes an exact copy of a source device and subsequently verifies the copy was performed correctly. The copying device is operating system independent.

A method consistent with aspects of the invention includes connecting a power supply to a copying device, connecting an interface cable associated with the copying device to a long-term memory component (source) in a computer and powering up the computer. The method further includes connecting an interface cable and a power cable associated with the copying device to another long-term memory component (destination). The method further includes activating the copying device via a switch attached to the copying device, making an exact copy, and signaling completion of the copy process.

Another method consistent with aspects of the invention includes connecting a power supply to a copying device, connecting an interface cable and power cable associated with the copying device to a long-term memory component (source). The method further includes connecting an interface cable and a power cable associated with the copying device to another long-term memory component (destination). The method further includes activating the copying device via a switch attached to the copying device, making an exact copy, and signaling completion of the copy process.

Yet another aspect of the invention is directed to a device for making an exact copy of a long-term storage device. The device includes LEDs configured to provide feedback relating to an operational status of the device to a user, a user settable switch and interfaces and power cables for connecting to long-term memory components. The device further includes control circuitry coupled to the LEDs, the user settable switch and the interfaces, the control circuitry configured, when the switch is actuated by the user to make an exact copy. The control circuitry is enclosed in a portable casing and the LEDs, the user controllable switch, and the interface are mounted on an external portion of the casing.

BRIEF DESCRIPTION OF THE DRAWINGS

The accompanying drawings, which are incorporated in and constitute a part of this specification, illustrate the invention and, together with the description, explain the invention. In the drawings.

FIG. 2 is a sample printout from our invention.

DETAILED DESCRIPTION

Figure 1:
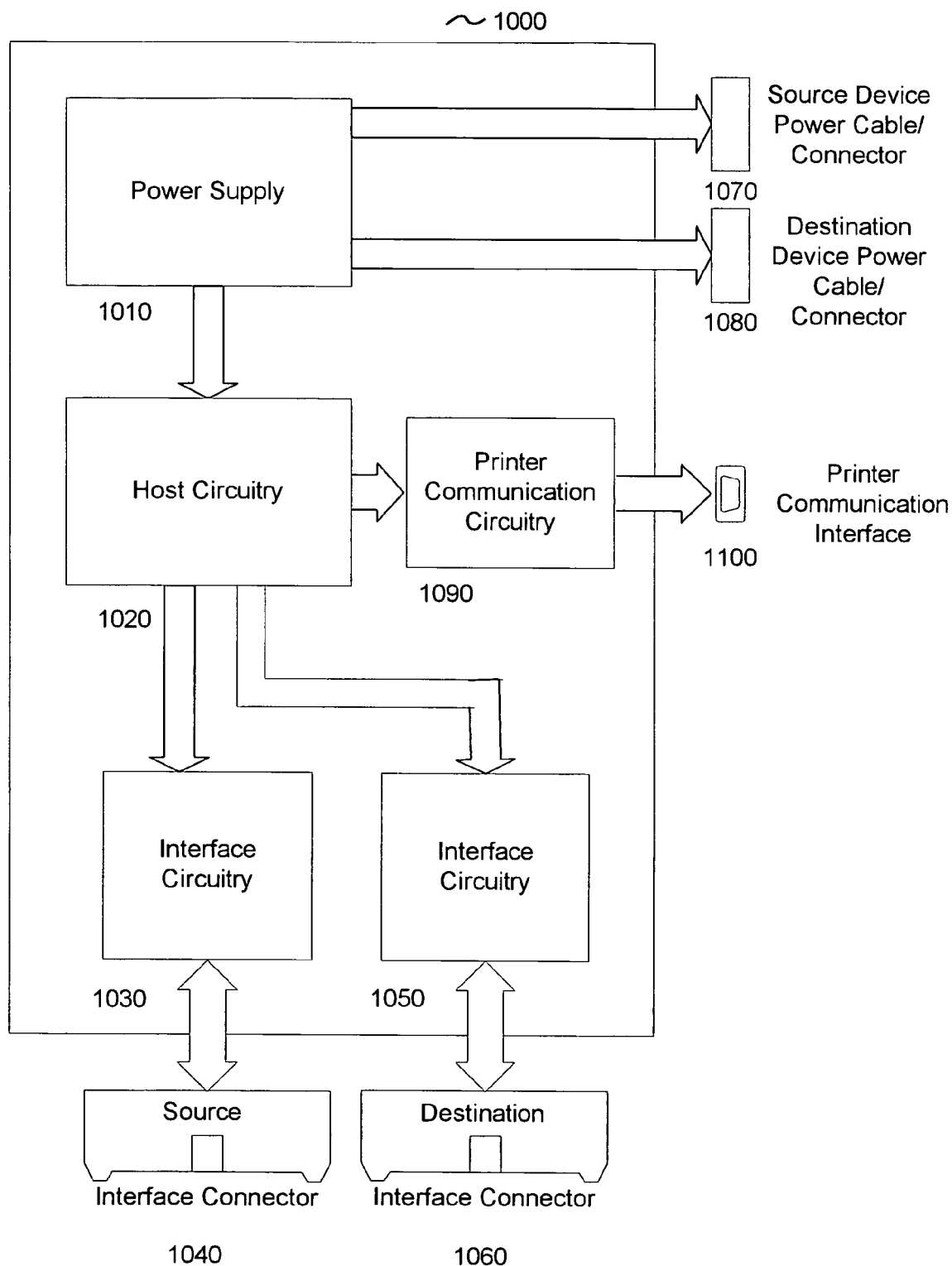
FIG. 1 is an illustration of a functional overview of our invention.

In the following detailed description, numerous specific details are set forth in order to provide a thorough understanding of the present invention. However, it will be understood by those skilled in the art that the present invention may be practiced without these specific details. The use of specific electronic components is disclosed to provide a thorough understanding of the preferred embodiment. However, one skilled in the art will appreciate that there are many electronic components with similar functionality, and the present invention is not limited to the components disclosed. In other instances, well known methods, procedures, components, and circuits have not been described in detail so as not to obscure aspects of the present invention.

For the sake of clarity, this detailed description of the preferred embodiment will describe an Integrated Drive Electronics (IDE) hard drive. One skilled in the art would appreciate that the method and system described here can be applied to other interfaces and other long-term storage devices.

COPYING DEVICE

Our device is able to make an exact copy of a long-term memory storage device on another long-term memory storage device of the same capacity or larger.

Our invention 1000 is a physical device that connects to two long-term storage devices such as hard drives 620 and 640. The long-term storage devices are connected to our device through cables 610 and 630. One of the long-term storage devices is designated as a Source device 620 and the other is designated as a Destination device 640. Our device creates an exact copy of the data on long-term storage device (source) 620 on long-term storage device (destination) 640.

In a standard configuration, our device is connected to two standard IDE hard drives. Please refer to FIG. 1. A drive containing the Source data is connected through a standard cable to Interface Connector 1040. Power for this drive is provided through an industry standard drive power connecter 1070. A drive that will receive the copy of the source data, or Destination Drive, is connected through a standard IDE cable to Interface Connector 1060. Power for this drive is provided through an industry standard drive power connecter 1080.

To a drive, our device appears to be a host computer. The source and destination drives are electrically isolated from each other through the use of separate Interface Circuitry for each drive, 1030 for the Source, and 1050 for the Destination. In a standard PC, two IDE drives can share the same interface circuitry. This has three disadvantages that are overcome by our invention.

The first is that with two drives using the same interface circuit, there is only half of the bandwidth available in the circuit for each drive. When making a copy of one drive to the other on the same circuit, the speed of the copy will be no more than ½ of the maximum bandwidth of the interface circuit, as the data must be read from one drive, then written to the other.

The second major problem with two drives using the same interface circuit is that it increases the chances that the source drive will inadvertently have data written to it. In order to read or write from an IDE drive, a command must be issued to the drive. Both drives receive the command, but only one is supposed to operate on it. A single data bit in one of the drive's command registers determines which drive should respond to the command. This means that should a source drive misinterpret this bit when a write command was being issued to the destination drive, it would be possible to write data to the source drive. The likelihood of this happening increases if there is a mismatch in the performance capabilities of the Source and Destination drives.

The last problem is that if two IDE drives share the same interface circuit, they must be configured by the user correctly, typically by using small jumper blocks, so that one drive is a master and the other a slave. This is a procedure that is fairly simple to a trained operator, assuming that proper documentation is handy for the drive. However, since improper jumper settings may cause one or both drives to temporarily malfunction, it is best to get the settings correct. By having separate Interface Circuitry for each drive, jumper settings will not cause a drive to malfunction. In addition, our device may detect the current drive settings and communicate with them properly.

One advantage that our invention has over simply trying to make a copy of a drive using a computer is that our device is operating system independent. It does not care what kind of data is on the drive, it simply makes a copy of a drive. This allows it to make a perfect copy of a drive regardless of the type of system that the drive was previously in.

Figure 6:
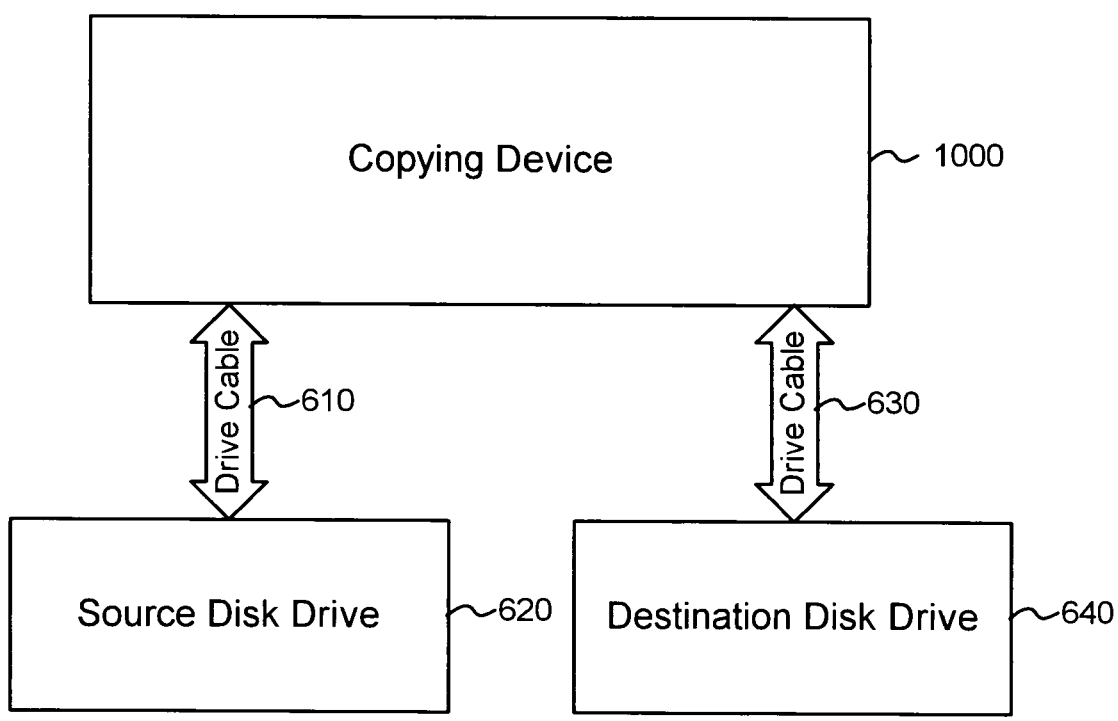
FIG. 6 is a block diagram of our invention

Please refer to FIG. 6. Our invention 1000 is a physical device that connects to two long-term storage devices such as hard drives (FIG. 1.) Our device is connected to a Source storage device through a standard cable 610 and to a Destination storage device through a standard cable 630. To each drive, our device appears to be a host computer.

In order to meet the goal of creating a perfect copy of a Source drive on a Destination drive, all of the data that resides on the Source must be copied. This would not seem to be a problem, but drives have functions that allow for data to be hidden. In order to make a copy, the hidden data must be made available to our device. There are two primary methods for hiding data on an IDE hard drive. One is by setting a Host Protected Area (HPA) and the other is by using the Device Configuration Overlay function.

Both of these methods hide data by causing the drive to report its size as smaller than it truly is. For instance, a 40 gigabyte drive could be instructed to report its size as 30 gigabytes. From that point on, any computer would see it as a 30 gigabyte drive. Any data stored in the area between 30 gigabytes and 40 gigabytes would be effectively hidden from the system If the data is hidden using the HPA method, the drive may be instructed to make the hidden area accessible temporarily. When a temporary change command is issued, the drive resorts to its previous state the next time that the drive is powered off and on again. If, however, the DCO method is used, there is no such temporary change command. Making a change to DCO settings is permanent until changed again.

This has the potential to cause a problem, especially when working with sensitive information, such as a police evidence drive. Any permanent change to the drive has the potential to make the drive unreadable. Under normal circumstances, our device would make the change, copy the data, and restore the DCO to its original configuration. This is fine in theory, but doesn't take into account events such an unforeseen power failure. Should the power fail at a point in time when the DCO has been set away from its original settings, potentially the drive could be left in an unreadable state.

It is still vitally important to be able to copy a Source drive, even with the risk of a change to the drive. Our invention uses the method as described in the U.S. Provisional Patent No. 60/443,388 entitled "Systems and Methods for Restoring Critical Data to Computer Long-Term Memory Device Controllers" to provide a method for restoring a drive to its original configuration. This keeps the risk down to an acceptable level.

Although our device automatically copies and then verifies the copy, there are situations where a user may be interested in just performing the copy operation. For this eventuality, one embodiment of our device allows a user to cancel the verification process through a user control. This control only affects the verification process, and has no effect during the copy process.

In most cases, a Destination drive will be larger than a Source drive. One of the objectives of our invention is to make a copy indistinguishable from a original. If both drives were the same size, and especially if they were the same make and model, this would not be too difficult. Once all of the sectors were copied, the drives would be identical. Having a larger Destination drive causes a problem simply by virtue of it being larger. If a comparison were done of the two drives, there would be a mismatch starting at the first sector beyond the end of the Source drive. This can lead to much confusion as seen in the case: "United States of America vs Zacarias Moussaoui" http://notablecases.vaed.uscourts.gov/1:01-cr-00455/docs/68092/0.pdf Our invention provides a solution to this problem by taking advantage of the ability of a drive to hide data. Using either the industry standard HPA method or the DCO method of hiding data, our device can make the Destination drive appear to be exactly the same size as the host. As such any comparison of the two drives will show them to have identical data.

The DCO function is very powerful. In addition to changing the size that the drive reports itself to be, it can also be used to change other drive parameters, such as the speed at which the drive can operate. Should the need arise, our device can use this function to more accurately match the reported capabilities of a Destination drive to a Source.

OPERATION OF THE COPYING DEVICE

Source drive interface 1030 allows connection to a drive through Interface Connector 1040. Similarly, Destination drive interface 1050 allows connection to a drive through Interface Connector 1060. Industry standard cables connect our device to the Source drive and the Destination drive. Our device, including cables, is physically designed to encourage an untrained user to connect it properly. When Drive Cable 610 is connected to Source Drive 620 and Drive Cable 630 is connected to Destination Drive 640, our device is ready to operate.

A DETAILED LOOK AT LOGIC FLOW

Figure 3:
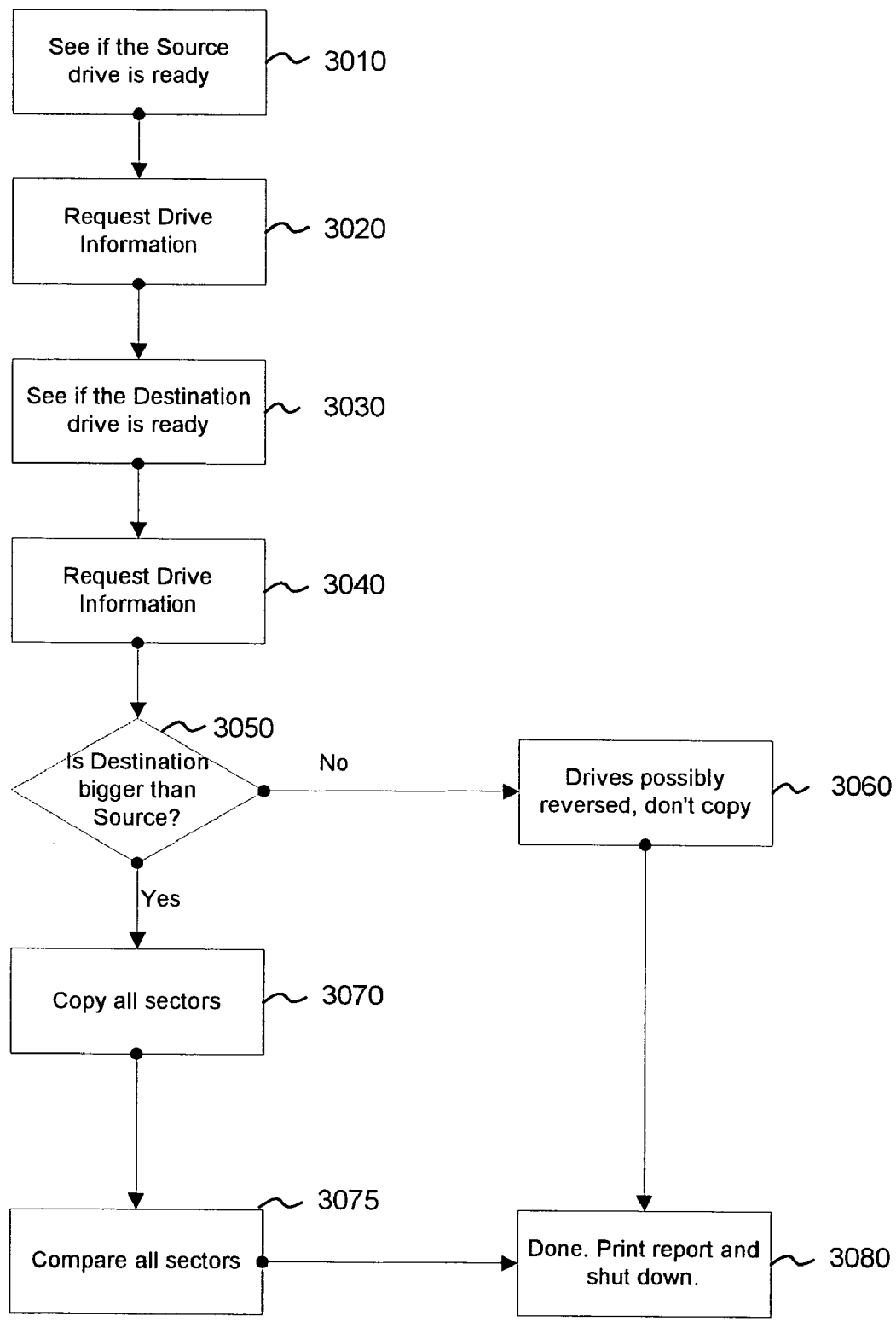
FIG. 3 is an illustration of the logic flow of our invention.
Figure 4:
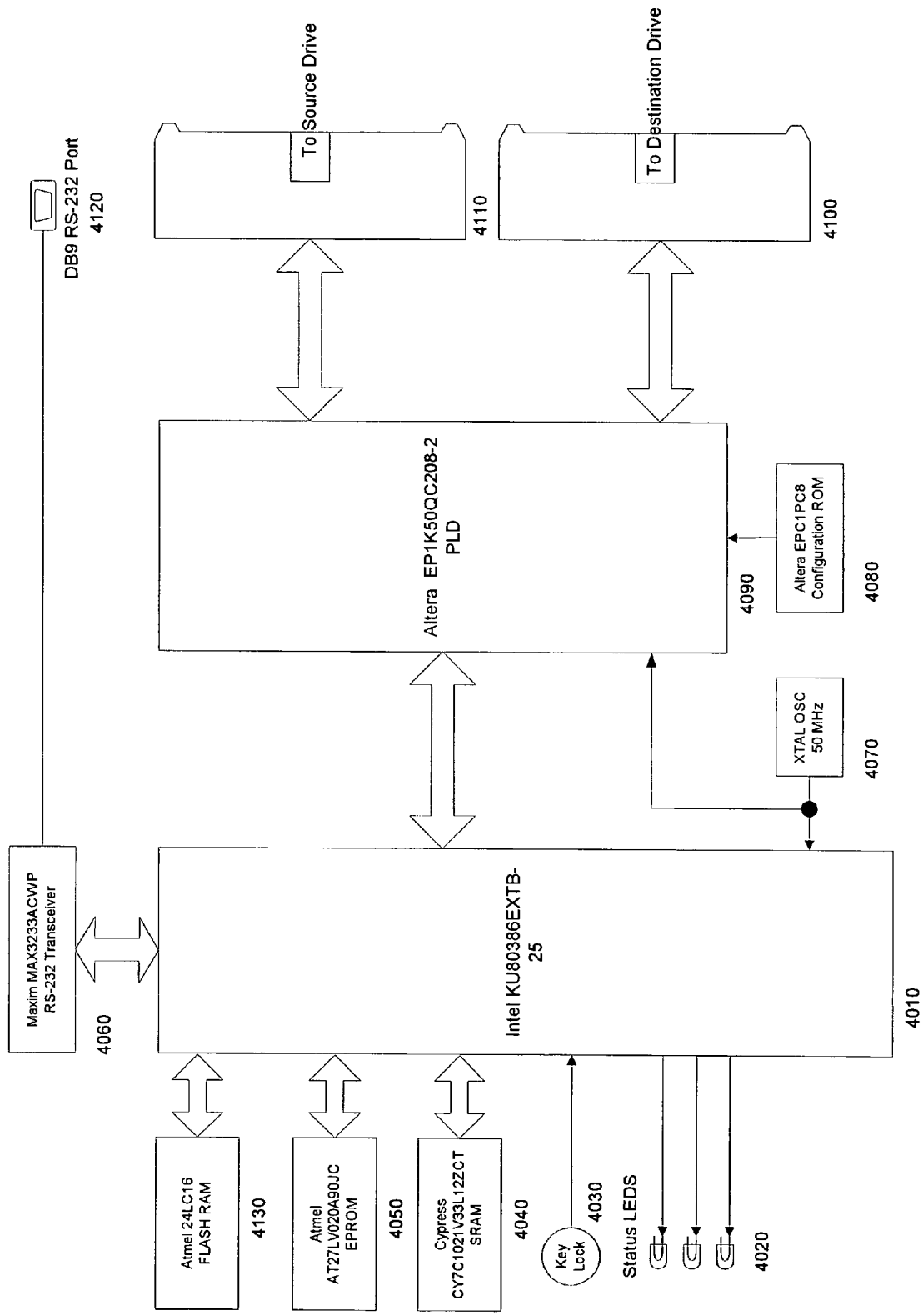
FIG. 4 is an illustration showing major electronic components and their connections, for the preferred embodiment

Please refer to FIG. 3, which details the logic flow in a preferred embodiment. On power up, our device detects the presence of a Source Drive and waits for it to become ready for operations 3010. Once the Source drive is determined to be ready, our device requests information about the drive 3020, such as its size and capabilities.

In a similar manner, our device detects the presence of a Destination Drive and waits for it to become ready for operations 3030. Once the Destination drive is determined to be ready, our device requests information about the drive 3040, such as its size and capabilities.

A comparison is made 3050 to determine if the Destination drive is big enough to hold all of the contents of the Source drive. If the Destination drive is too small 3060, there is the possibility that the Source and Destination drives have been reversed. The copy procedure is aborted and the user notified 3080 through status indicators and alternatively a printout.

If the Destination drive is the same size as the source or larger, then the copy procedure may begin. All of the sectors are then copied from the Source drive to the Destination 3070.

Once the data has been copied to the Destination drive, a data comparison 3075 is initiated. This comparison checks every byte in every sector of the Source drive to be sure that the copy has completed with no errors. When complete, the user is notified through status indicators and possibly a printout 3080.

A DETAILED LOOK AT AN ELECTRONIC BLOCK DIAGRAM

Figure 5:
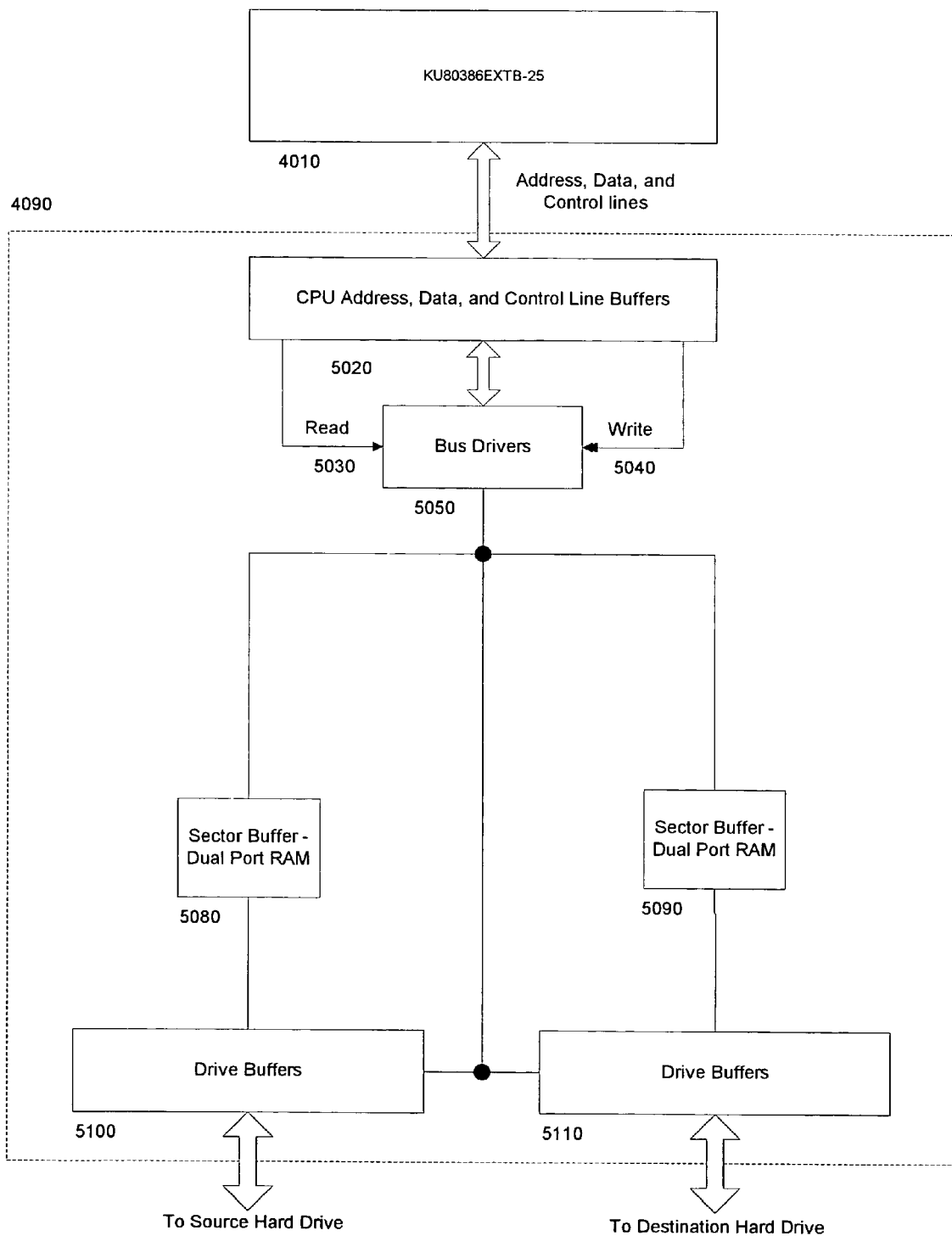
FIG. 5 is an illustration of the functions of a programmable logic device (PLD).

FIG. 5 is an illustration of a block diagram of our device. Our device uses an Intel 80386 EX embedded processor 5010 for its main control and logic function. This version of Intel's 80386 processor is optimized for embedded applications. The highly integrated design of this processor means that very little additional circuitry is necessary to create a small, dedicated computer system. Some static RAM is provided in 5040, which is used for temporary program and data storage. 5050 is an EPROM that holds the code necessary to initialize and run the processor. Timing is generated by a 50 MHz crystal oscillator, 5070.

The 80386EX 5010 has I/O pins available that may be used to connect additional devices. Three of these pins are used to power LED status indicators 5020 in order to provide feedback to a user. Another of these I/O pins, used as an input, may be used to connect a key lock 5030 to the processor.

A Programmable Logic Device, or PLD, is used to integrate numerous logical devices into a single chip 5090. Configuration data for the PLD is stored in a configuration ROM 5080. Timing for the PLD is generated by a 50 MHz crystal oscillator, 5070. When the PLD is reset, it automatically tries to load configuration information from its ROM. When configuration is complete, this single chip 5090 can be viewed as having all of the functionality shown in FIG. 6.

FIG. 5 shows a breakdown of the functions implemented by the PLD 4090. The address, data, and control lines from the processor 4010 are routed to the PLD. They are then buffered and latched in 4020 as necessary to reduce the electrical load on the processor and to stabilize the signal timing. Buffered read 4030 and write 4040 signals control the direction of the bus drivers shown in 4050. These buffers help control the data flow and distribution of the address and data busses from the processor to other functions in the PLD.

Buffering and signal conditioning for the Source Drive is provided by the Drive Buffers in 5100, making this the Drive Interface. Through the Bus drivers 5050 the processor can directly read and write to the Drive Interface. Another way that the processor and the Drive may communicate is through the Dual Ported RAM Sector Buffer 5080. This allows the drive to write one sector's worth of data to RAM at high speed, while the processor performs other tasks. By allowing the operations to overlap in this fashion, the processor is not restricted to running at the speed of the drive, and is free to handle other functions until it needs the data in the Sector Buffer.

Similarly, buffering and signal conditioning for the Destination Drive is provided by the Drive Buffers in 5110, making this the Drive Interface. Through the Bus drivers 5050 the processor can directly read and write to the Drive Interface. Another way that the processor and the Drive may communicate is through the Dual Ported RAM Sector Buffer 5090. This allows the drive to read one sector's worth of data from RAM at high speed, while the processor performs other tasks. By allowing the operations to overlap in this fashion, the processor is not restricted to running at the speed of the drive, and is free to handle other functions until it needs the data in the Sector Buffer.

The 80386EX processor 4010 has a UART built in that may be used for serial communications. For versions of our device that require such communication capabilities, the UART is connected to an RS-232 transceiver 4060. This part not only buffers the signals, it also generates the necessary voltages required for RS-232 communications. A standard DB9 connector 4120 allows our device to be connected to a computer using a standard DB9 male to female serial cable.

In the preferred embodiment, the goal of making this device foolproof for use by an untrained person is accomplished in a number of ways. The first is that the device is controlled by a single switch, such as Key Lock 4030. This switch has only two choices, on and off. When switched on, the device starts operation and provides any required feedback to the user through one or more indicators, such as LEDs 4020. Under normal circumstances, the only indicator that the user need be concerned with is the "Operation Complete" indicator. Additional indicators may be available for such error conditions as "Destination Drive Too Small" or "Copy in Progress." These indicators may be as simple as LEDs.

For additional detailed status, a printer may be connected to the device through communication port 4120. Information sent to the printer may include Drive identification information to uniquely identify the drive being copied. Should any errors occur, such as a bad sector on the Source disk, the sector number may be printed.

Should an unreadable sector be identified on the Source drive, something still must be written to the Destination drive. In the case of this type of error, our device writes a standard, predefined bit pattern to the corresponding area on the Destination drive.

ADDITIONAL FEATURES

When our device is used for law enforcement forensics work, a detailed analysis is typically performed on the Destination drive after the copy has been completed. This eliminates the need to perform any work on the Source drive, which is typically an evidence drive.

An additional embodiment of our device helps to speed up the analysis process. As can be seen from the earlier technical description, at some point during the copy operation, all of the data from the Source drive passes through PLD 4090. The data paths described allow for the Processor 4010 to have access to the data. With this ability, one skilled in the art could see how the processor would have the ability to perform an analysis of the data during the copy process.

For this embodiment, the user would communicate with our device through the RS-232 data port 4120. The bit pattern being sought would be sent to our device. As the data is transferred from the Source drive to the Destination, the processor scans the data, looking for the specified bit pattern. Should the bit pattern be found, our device can report it to an attached printer or PC.

Ideally, the processor should be fast enough to scan for a specific bit pattern without causing a slowdown in the copy process. There are cases where it is desirable to scan for more than one specific bit pattern. One solution is to simply select a faster processor. This is a reasonable solution up to a point, but depending on how many bit patterns must be scanned during the copy operation, it may not be practical to select such a processor. Assuming that such a processor was available, its price could easily prohibit its use.

Figure 7:
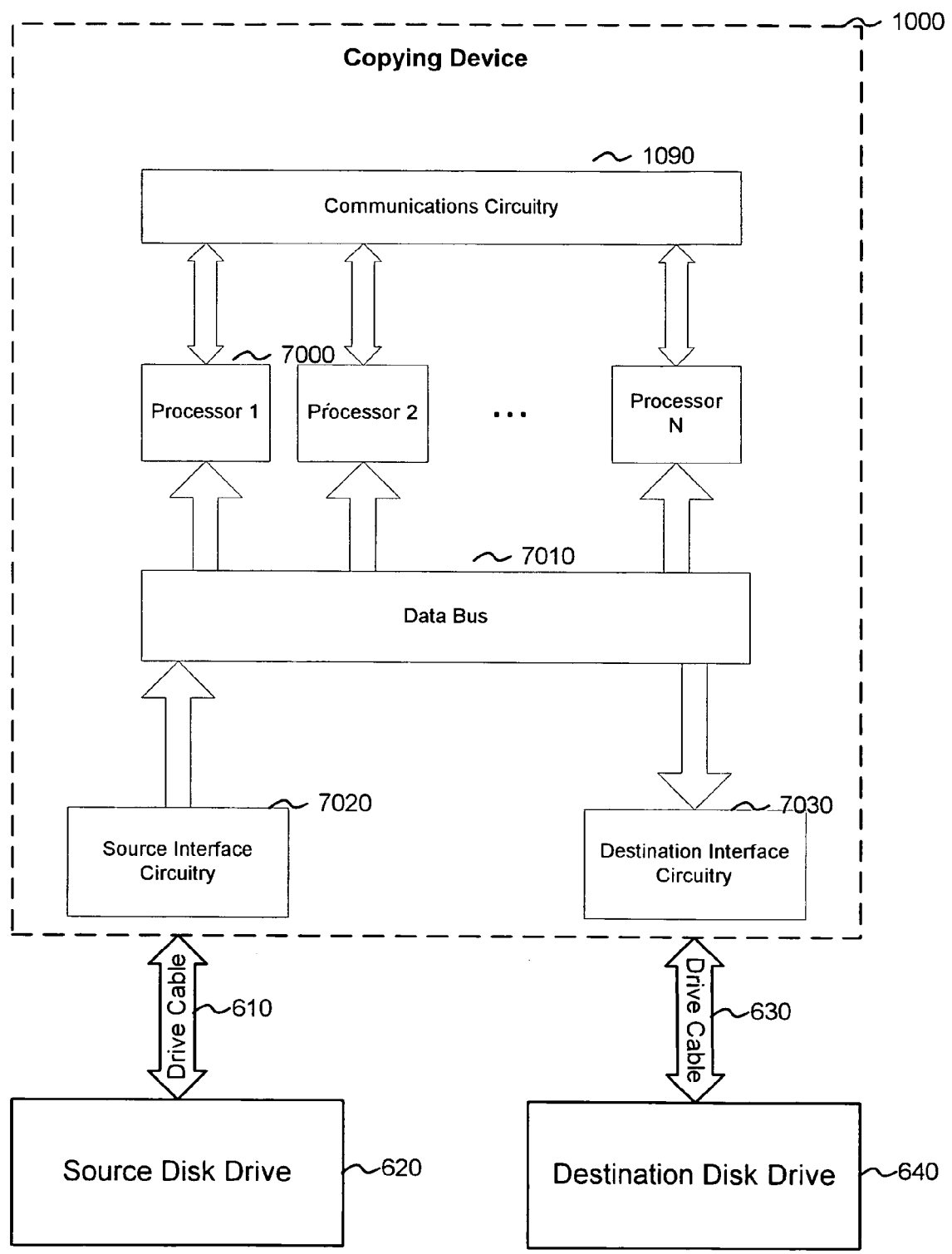
FIG. 7 is an illustration of our invention using multiple processors

A more cost effective solution than just trying to use one incredibly fast processor is to use multiple lower performance, less expensive processors as shown in FIG. 7. Each processor would be able to scan for one or more bit patterns, up to their performance limits. In this case, as data is transferred from the Source Disk Drive 620 to Data Bus 7010, Processors 1 through N 7000 each have access to the data arriving on Data Bus 7010. Each processor may scan for one or more bit patterns within the data. The desired bit patterns may be built in to our device or may be communicated to the device through Communications Circuitry 1090. If the bit pattern is detected by one of the processors, this fact is communicated to the User or another computer through Communications Circuitry 1090.

A way to reduce the cost and complexity of a multiprocessor system is to take advantage of recent advances in Programmable Logic Devices. Newer PLDs, such as the Stratex devices from Altera Corporation of San Jose, Calif., are large enough to have processors embedded in them. The logic to create Processors to embed in PLDs is available from many sources, including Altera. Logic for other processors may even be downloaded from the Web from such sites as OpenCores.org.

Using such off-the-shelf logic, one skilled in the art would understand the benefit of embedding the processor in the PLD. Not only does it reduce the complexity of the physical PC board, but by reducing component count, the reliability of the resulting product is increased. This is especially true of a multiprocessor system. The interconnects between the data bus and each processor are shorter and more reliable if they are all within a single chip. In addition, processor support logic, such as program memory and RAM, may also be created within the PLD. The result is a single chip with multiple processors, each having the ability to examine the same set of data.

Like many functions performed by a processor, there are multiple ways of accomplishing the same task. In this case, rather than writing code to examine each byte of data for a bit pattern, the PLD could be configured to directly test the incoming data from a Source drive against the bit pattern. When this comparison is done in the PLD, it is done at hardware speeds. This method has an advantage over a processor based scan in that it is more likely to be able to keep up with advances in data transfer speeds of long-term storage devices.

By definition, if the PLD is moving the data, it is fast enough to compare the data to a bit pattern as it moves. This may not always be the case when the PLD moves the data and a processor tries to examine it. The PLD may have to slow down so that the processors can keep up.

The PLD solution is a little more complex to implement. If the bit patterns to be scanned are known at the time of design, the device can be configured from the factory. It would be quite rare for this to happen. In order to accommodate varying numbers of bit patterns to scan and different scanning requirements for each customer, the PLD would have to be reconfigured on-the-fly to meet the customer requirements. This raises the complexity level of the design, yet would be transparent to the user.

While having the PLD do the bit pattern comparison directly has a lot of advantages, it is not without its drawbacks. The primary one of these is that as more bit patterns need to be scanned, the complexity of the device may have to be increased. Such an increase typically comes with a higher price tag. This brings the decision as to the preferred method for scanning to a decision that can easily be made on a price/performance basis. As technology evolves, the preferred embodiment of this invention is likely to as well.

In an additional embodiment, our invention may be able to scan a long-term storage device without copying data. In the simplest case, this would be the default operation if no Destination device is detected. For a slightly more complex version of our invention, a control would be available for the user to request the scanning function.

USER COMMUNICATION

In the implementations described above, copying device 1000 signals its operational status to a user through LEDs 4020. For example, LEDs may be used to signal that: (1) copying device 1000 is performing, (2) copying device 1000 has finished copying the source device, and (3) an error was encountered.

In alternate embodiments, copying device 1000 may include additional display devices such as a graphical display or a connection to a printer. With these output devices, additional status information such as percentage of operations complete, time until operations are complete, and information about the target device may be displayed. The printer could be used to generate a continuous written record of the operations performed on the target device, including information about the devices themselves. This written record may include, for example, type of devices, time and date of data copy, and read/write errors encountered. In a similar implementation, copying device 1000 could interact with a host computer through interface 4120 to upload status information to the host computer. In another implementation, interface 4120 could be used to receive bit patterns to scan from a host computer.

Although the copying device discussed above was primarily described as copying an IDE device, in other implementations, long-term storage devices having other interfaces, such as FireWire, USB2, or SCSI could be copied using concepts similar to those discussed herein.

In addition, the copying device has been primarily described as copying from an IDE device to an IDE device. It will be apparent to one of ordinary skill in the art that the copying device could instead or additionally have different interfaces for source and copy devices. For example, the copying device may copy from an ATA device and copy to a Firewire device.

CONCLUSION

As described above, a copying device makes exact copies of a long-term storage device, while protecting the source device from inadvertent state changes. The copying device is portable, provides easy to understand user feedback, has a simple user interface and could thus be effectively used by non-technical people.

The copying device has a number of advantages. It is operating system independent. The copying device can operate while the source device is still in the host computer system or when it has been removed from the host computer system. It is a stand alone device that can replace more complicated and more expensive devices or systems. Additionally, the copying device does not require that the operator have any particular knowledge of the source device; it detects the capabilities and settings of the source device and adjusts the operating parameters for optimal performance without user intervention.

Still further, the copying device copies data from all partitions on the source device, regardless of the data's format, and removes any reserved or protected data areas, so that all of the data storage areas on the target device are available for copying without requiring user intervention. Additionally, the copying device can reset the source device to its original state. The copying device provides feedback to a user that it has either performed operations correctly or has run into an error. The copying device verifies the copy was preformed correctly.

Additionally, the copying device may be configured to display a report of the copying process and information about the devices involved. The copying device may be configured to accept one or more bit patterns to scan during the copying process. The copying device may be further configured to perform a scan only.

It will be apparent to one of ordinary skill in the art that the embodiments as described above may be implemented in many different forms of software, firmware, and hardware in the implementations illustrated in the figures. The actual software code or specialized control hardware used to implement aspects consistent with the present invention is not limiting of the present invention. Thus, the operation and behavior of the embodiments were described without specific reference to the specific software code, it being understood that a person of ordinary skill in the art would be able to design software and control hardware to implement the embodiments based on the description herein.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

No element, act, or instruction used in the description of the present application should be construed as critical or essential to the invention unless explicitly described as such. Also, as used herein, the article "a" is intended to include one or more items. Where only one item is intended, the term "one" or similar language is used.

The scope of the invention is defined by the claims and their equivalents.

What is claimed:

1. A stand-alone, dedicated function device for making exact copies of long-term memory devices comprising:
    an interface for connecting to a storage device (source);
    one or more interfaces for connecting to the storage device(s) (destination);
    wherein the interfaces are electronically isolated from each other through the use of separate interface circuitry for each interface;
    a user controllable switch that, when actuated by a user, causes the device to commence a copy;
    and a control circuit coupled to the interface (source) and the interface(s) (destination), the control circuit issuing commands to: compare the size of the source device to the size of a destination device and communicate result to a user, open hidden areas on the source device, make an exact copy of the storage device connected to the interface (source), read and compare data on the source and destination devices and communicate result to a user, restore the source drive to its original condition, wherein the copying device is operating system independent.

2. The copying device of claim 1, wherein a user controllable switch is connected to the control circuit to interrupt the verification procedure.

3. The copying device of claim 1, wherein the interface is an integrated device electronics (IDE) interface for a disk drive.

4. The copying device of claim 1, wherein the hidden area the control circuit removes or modifies is a Host Protected Area (HPA).

5. The copying device of claim 1, wherein the hidden area the control circuit removes or modifies is Device Configuration Overlay settings (DCO).

6. The copying device of claim 1, wherein the control circuit sets the size of a copied device to the size of a source device.

7. The copying device of claim 1, further comprising: one or more additional interfaces for connecting to display and/or output devices, to produce a report.

8. The copying device of claim 1, wherein the control circuit writes a standard bit pattern on a copy device to indicate unreadable data on the source device.

9. The copying device of claim 1, further including light emitting diodes (LEDs) coupled to the control circuit and configured to transmit status information relating to the status of the copying device.

10. The copying device of claim 1, wherein the control circuit scans the source device for one or more specific bit patterns, during the copy procedure.

11. The copying device of claim 10, further including: a user controllable switch is connected to the control circuit to enable scanning functions only.

12. The copying device of claim 10, further including: one or more additional interfaces for connecting to input devices, to receive specific bit patterns to scan.

13. The copying device of claim 1, further comprising: a casing configured to contain the control circuit and the interface, the user controllable switch being mounted on the casing, the casing being of a size that is portable by the user.

14. The copying device of claim 13, further comprising: cables emanating from the casing and connected to the interfaces, the cables being configured to connect to long-term memory devices.

15. The copying device of claim 14, wherein the cables are Integrated Device Electronics (IDE) cables.

16. The copying device of claim 1, further comprising: a power supply configured to supply power to the control circuit.

17. The device of claim 16, further comprising: drive power cords emanating from the casing and configured to supply power from the power supply to the long-term memory components.

18. A stand-alone, dedicated function copying device comprising:
    means for interfacing with a source drive,
    wherein the source device is protected from accidental state changes;
    means for interfacing with one or more destination devices;
    means initiating the copying procedure;
    means for comparing the size of the source device to the size of a destination device and communicating result to a user;
    means for opening hidden areas on the source device;
    means for making an exact copy;
    means for reading and comparing the data on the source and destination devices and communicating result to a user;
    means for restoring the source device to its original condition,
    wherein the copy device is operating system independent.

19. The copying device of 18, further comprising: means for scanning for one or more specific bit patterns.

20. The copying device of 18, further comprising: means for indicating areas on a source device that were unreadable.

21. The copying device of 1, wherein the source and destination devices have different interfaces.

* * * * *